United States Patent

Lockwood

[15] 3,676,717

[45] July 11, 1972

[54] NONVOLATILE FLIP-FLOP MEMORY CELL

[72] Inventor: George C. Lockwood, Kettering, Ohio

[73] Assignee: The National Cash Register Company, Dayton, Ohio

[22] Filed: Nov. 2, 1970

[21] Appl. No.: 86,190

[52] U.S. Cl. ................................307/304, 307/251, 307/279

[51] Int. Cl. ................................................H03k 23/08

[58] Field of Search .............307/205, 221 C, 251, 279, 304, 307/238

[56] References Cited

UNITED STATES PATENTS

| | | | |
|---|---|---|---|
| 3,292,008 | 12/1966 | Rapp | 307/251 |
| 3,518,635 | 6/1970 | Cole | 307/238 |
| 3,363,115 | 1/1968 | Stephenson | 307/279 |
| 3,389,383 | 6/1968 | Burke et al. | 307/279 |
| 3,390,382 | 6/1968 | Igarashi | 307/279 |
| 3,493,786 | 2/1970 | Ahrons et al. | 307/279 |
| 3,514,765 | 5/1970 | Christensen | 307/251 |
| 3,539,839 | 11/1970 | Igarashi | 307/279 |
| 3,541,530 | 11/1970 | Spampinato et al. | 307/279 |
| 3,550,097 | 12/1970 | Reed | 307/238 |
| 3,560,764 | 2/1971 | McDowell | 307/238 |

OTHER PUBLICATIONS

Electronics Review Page 49 & 50 Volume 41 Number 22 Oct. 28, 1968

Boysel " Multiphase Clocking Achieves 100 Nsec Mos Memory" Pages 50, 51, 52, 54, 55 Electronic Design News June 10, 1968

Short " MOS FET Shift Register Element" Pages 1047- 1049 Vol. 9 No. 8 Jan. 1967 IBM Technical Disclosure Bulletin

*Primary Examiner*—Donald D. Forrer
*Assistant Examiner*—R. E. Hart
*Attorney*—Louis A. Kline, John J. Callahan and John P. Tarlano

[57] ABSTRACT

The present invention relates to a nonvolatile flip-flop memory cell in which an alterable threshold voltage nonvolatile MNOS field effect transistor is connected to each bistable terminal of a volatile flip-flop circuit. The nonvolatile MNOS field effect transistors nonvolatilely retain the state of the volatile flip-flop circuit during a power failure to the flip-flop circuit. During the power failure to the volatile flip-flop circuit, the threshold voltage of one of the nonvolatile MNOS field effect transistors is changed, to nonvolatilely retain the state of the volatile flip-flop circuit. The state of the flip-flop circuit is reset when power is restored, with the aid of the nonvolatile MNOS field effect transistors.

When a power failure to the volatile flip-flop circuit is sensed, a high negative potential is applied to the gates of the nonvolatile MNOS transistors to change the threshold of the nonvolatile MNOS transistor which is connected to the zero potential terminal of the volatile flip-flop circuit. The state of the volatile flip-flop circuit is retained in said nonvolatile MNOS field effect transistors. The binary bit of information nonvolatilely stored in the nonvolatile memory cell is read back into the volatile flip-flop circuit when power is restored.

15 Claims, 3 Drawing Figures

FIG. I

INVENTOR
GEORGE C. LOCKWOOD

BY Louis A Klein
John J. Callahan
John P. Tarlano
HIS ATTORNEYS

INVENTOR
GEORGE C. LOCKWOOD

BY Louis A Klein
John J Callahan
John P. Tarlano
HIS ATTORNEYS

INVENTOR
GEORGE C. LOCKWOOD
BY Louis A Klein
John J. Callahan
John P. Jarlano
HIS ATTORNEYS

NONVOLATILE FLIP-FLOP MEMORY CELL

BACKGROUND OF THE INVENTION

A. A. Hodges, in Proceedings of the IEE, Volume 56, No. 7, July 1968, at page 151, shows the use of a volatile MOS transistor connected to each bistable terminal of a volatile flip-flop circuit to set a volatile flip-flop circuit. The volatile MOS field effect transistors are used to set the volatile flip-flop circuit to one stable state or the other stable state while power is on. However, the volatile MOS transistors are not used to nonvolatilely store the state of the volatile flip-flop circuit therein during a power failure, nor to reset the flip-flop circuit when power is reapplied to the flip-flop circuit.

In the nonvolatile flip-flop cell of the present invention, an alterable threshold voltage nonvolatile MNOS (metal-silicon nitride-silicon oxide-silicon) field effect transistor is connected to each bistable terminal of a volatile flip-flop circuit, to allow the nonvolatile storage of the state of the flip-flop circuit when power is off. During a power failure to the flip-flop circuit, the state of the volatile flip-flop circuit may be automatically stored within the nonvolatile MNOS transistors, by charging the threshold of one of the MNOS transistors. The threshold voltage of the nonvolatile MNOS transistor which is connected to the zero voltage terminal of the volatile flip-flop circuit may be decreased. During the resumption of power to the volatile flip-flop circuit, the nonvolatile MNOS transistor whose threshold voltage has not been changed will conduct first, to properly reset the volatile flip-flop circuit. The nonvolatile MNOS field effect transistor whose threshold voltage has been changed will not yet conduct. The volatile flip-flop circuit is thus properly reset to the state which it had prior to the loss of power thereto, due to the different beginning times of conduction of the two nonvolatile MNOS field effect transistors which had nonvolatilely stored the state of the volatile flip-flop circuit.

Hodges does not show the storing and the resetting of the state of a volatile flip-flop circuit, by means of nonvolatile field effect transistors. Hodges shows a volatile memory cell from which information is completely lost during a power failure.

The present invention relates to a nonvolatile memory cell having a volatile flip-flop circuit whose state may be nonvolatilely stored during a power failure and recovered after a power failure. A nonvolatile MNOS field effect transistor is connected to each bistable terminal of the volatile flip-flop circuit to form the nonvolatile flip-flop memory cell.

By "volatile" is meant that information is lost when power is not applied. By "nonvolatile" is meant that information is retained even though power is not being applied.

SUMMARY OF THE INVENTION

A nonvolatile memory cell for nonvolatilely holding a binary bit of information therein without power being applied thereto, comprising volatile bistable memory means having two bistable terminals for storing a binary bit of information therein and reading binary information thereout when power is supplied thereto, and first and second nonvolatile memory means connected to the two bistable terminals of the volatile bistable memory means, for nonvolatilely storing the relative voltage values of the two bistable terminals of the volatile bistable memory means during the loss of power to the volatile bistable memory means, so that the binary bit of information is nonvolatilely held during the absence of power to the volatile bistable memory means.

An object of the present invention is to provide a nonvolatile flip-flop memory cell.

DESCRIPTION OF THE PREFERRED EMBODIMENT

Figure 1:
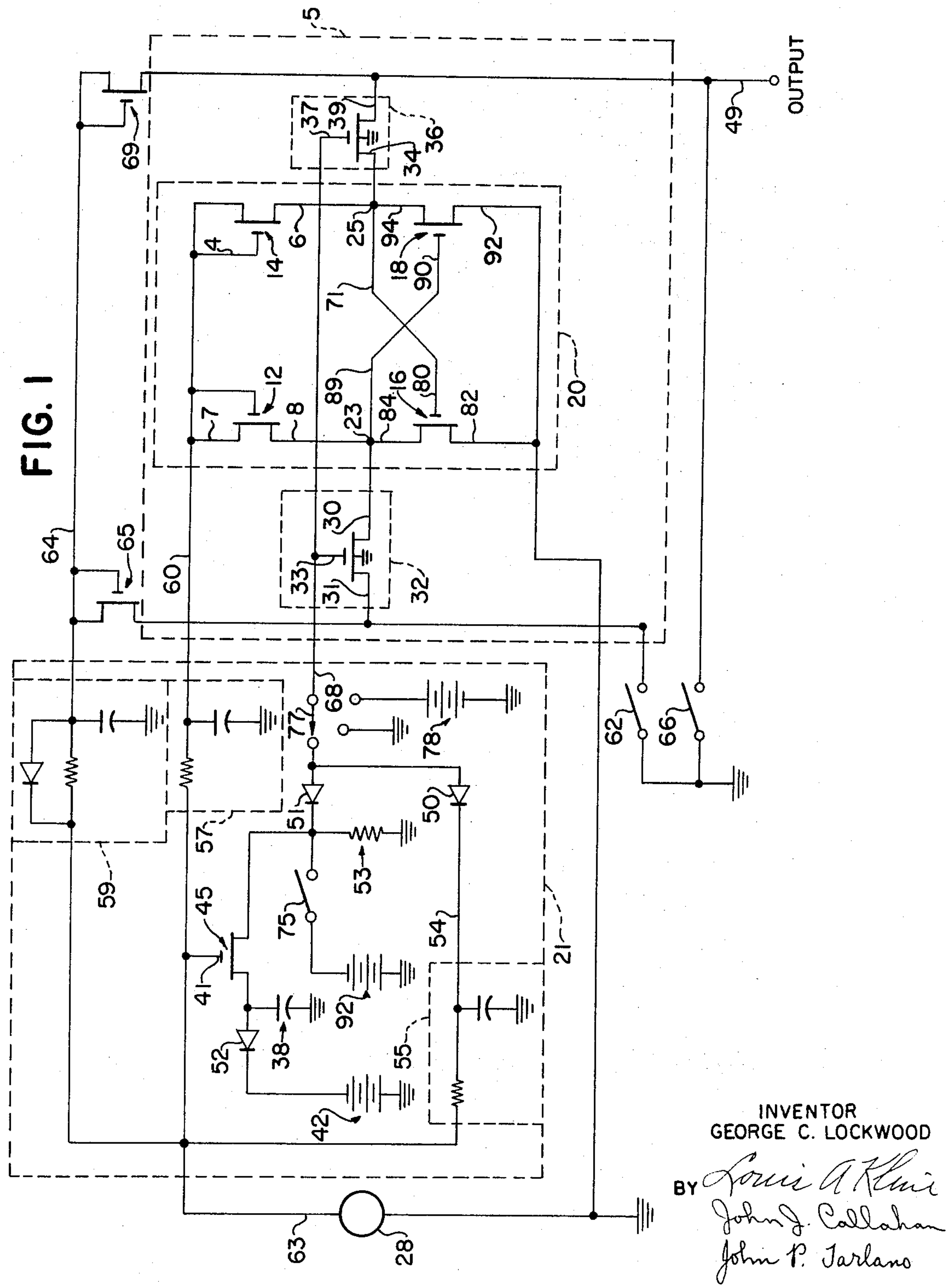
FIG. 1 is a schematic view of the nonvolatile memory cell of the present invention.

As shown in FIG. 1, the source electrode 8 of a p-channel MOS transistor 12 is connected to the drain electrode 84 of a p-channel MOS transistor 16 at the terminal 23. Similarly, the source electrode 6 of a p-channel MOS transistor 14 is connected to the drain electrode 94 of a p-channel MOS transistor 18 at the terminal 25. The terminal 23 is connected to the gate electrode 90 of the MOS transistor 18 by a lead 89. The terminal 25 is connected to the gate electrode 80 of the MOS transistor 16 by a lead 71. This arrangement forms a volatile flip-flop circuit 20. The volatile flip-flop circuit 20 has a left terminal 23 and a right terminal 25.

The source electrodes 30 and 34 of the nonvolatile MNOS transistors 32 and 36 are connected to the two terminals 23 and 25, as shown in FIG. 1, so as to form a nonvolatile flip-flop memory cell 5. The drain electrodes 31 and 39 are connected to load transistors 65 and 69. The gate electrodes 33 and 37 are commonly connected.

When the voltage at the terminal 23 is at zero volts potential with respect to ground, the MOS transistor 18 is held off. The voltage at the terminal 25 is then at approximately minus 21 volts, due to a −24 volts being applied to the drain electrodes 7 and 4 of the MOS transistors 12 and 14 via the line 60. The MOS transistor 16 is on. The volatile flip-flop circuit 20 is said to be in a zero state. The voltage at the terminal 25 is due to minus 24 volt power supply 28 connected to the volatile flip-flop circuit 20 through a line 60 from a line 63. The power supply 28 is at approximately minus 24 volts in potential with respect to ground potential.

In order to nonvolatilely store the voltage of the terminal 23 and of the terminal 25 of the volatile flip-flop circuit 20 of FIG. 1, the p-channel nonvolatile MNOS (metal-silicon nitride-silicon oxide-silicon) field effect transistors 32 and 36 are used at the terminals 23 and 25. The method of making the nonvolatile MNOS transistors 32 and 36 is described in U.S. Pat. application Ser. No. 869,699, filed Oct. 27, 1969, by Charles T. Naber, entitled "Method of Oxidizing a Silicon Wafer," and assigned to the present assignee.

The source electrode 30 of the nonvolatile MNOS transistor 32 is connected to the terminal 23. The source electrode 34 of the nonvolatile MNOS transistor 36 is connected to the terminal 25. The drain electrodes 31 and 39 of the nonvolatile MNOS transistors 32 and 36 are connected to MOS load transistors 65 and 69. MOS load transistors have a large resistance compared to the resistance of the MNOS transistors 32 and 36. The MOS Load transistors 65 and 69 are connected via the line 64 to the power supply 28 through a time delay circuit 59. The time delay circuit 59 allows for a negative voltage to continue on the load transistors 65 and 69 for an added period of time during a power failure.

The gate electrodes 33 and 37 of the nonvolatile MNOS transistors 32 and 36 are connected to a negatively charged 30-volt capacitor 38 through an n-channel depletion mode transistor 45 via the line 68 and the switch 77. During a power failure to the volatile flip-flop circuit 20, a threshold changing voltage of minus 30 volts is applied from the charged capacitor 38 via the line 68 to the gate electrodes 33 and 37, due to the turning on of the depletion mode transistor 45. Nearly 30 voltage difference exists between the gate electrode 33 and the source electrode 30 and the grounded drain electrode 31, to change the threshold voltage of the nonvolatile MNOS transistor 32 from minus 2 volts to minus 6 volts. The drain electrode 31 is placed at minus 2.5 volts due to voltage division between the MOS transistor 65 and the MNOS transistor 32, after the MNOS transistor 32 is on. The gate electrode 37 of the MNOS transistor 36 is also connected to the minus 30-volt capacitor 38 through the depletion mode transistor 45. However, since the terminal 25 is at approximately minus 21 volts, the source electrode 34 and the drain electrode 39 of the MNOS transistor 36 are both at minus 21 volts. The minus 9 volts which exist between the gate electrode 37 and the source and drain electrodes 34 and 39 of the p-channel nonvolatile MNOS transistor 36 is not sufficient to cause that nonvolatile MNOS transistor 36 to have its threshold voltage changed from minus 2 volts to minus 6 volts. The minus 30-volt capacitor 38 causes a change only in the threshold voltage of the p-channel nonvolatile MNOS transistor 32. The lower threshold voltage of the p-channel nonvolatile MNOS transistor 32 than the threshold voltage of the p-channel MNOS transistor 36 is used to store the information of the volatile flip-flop circuit 20 during the power failure.

The gate electrode 41 of the depletion mode transistor 45 is connected to the power supply 28. When the power supply 28 is operating at a minus 24 volts, the depletion mode transistor 45 is in an off state. When the voltage of the power supply 28 fails, the depletion mode transistor 45 turns on, and the negatively charged capacitor 38 automatically lowers the threshold voltage of the p-channel nonvolatile MNOS transistor 32, which is connected to the zero volt terminal of the volatile flip-flop circuit 20. The voltage on the line 64 is maintained at minus 24 volts for a short time after the power failure by the time delay circuit 59.

A diode 52 is connected between the capacitor 38 and a minus 30-volt power supply 42 to allow for the charging of the capacitor 38 to a minus 30 volts while the power supply 28 is supplying power to the volatile flip-flop circuit 20 via the line 60, but not to allow the capacitor 38 to discharge directly to ground when the voltage of the power supply 28 begins to fail. The diode 50 prevents the charged capacitor 38 from discharging to ground through the line 54 during a pulse from the capacitor 38 on the line 68. The resistor 53 determines the pulse shape from the capacitor 38 on the line 68. The diode 51 prevents a voltage on the line 54 from being connected to ground through the resistor 53.

The drain electrodes 31 and 39 of the MNOS transistors 32 and 36 are connected to the minus 24-volt power supply 28 through the MOS load transistors 65 and 69, via the line 64 and the pulse-shaping circuit 59.

The terminals 23 and 25 may also be connected to ground through the switch 62 or the switch 66 to set the flip-flop circuit 20 to a different state. The read-write switch 75, which supplies a minus 12 volts from the battery 92, is used to turn on both MNOS transistors 32 and 36 during the normal reading or writing of the flip-flop circuit 20. The line 60 supplies a minus 24 volts to the flip-flop circuit 20 during normal reading or writing of the flip-flop circuit 20. The flip-flop circuit 20 may be charged to a "1" state by momentarily closing the switches 66 and 75. The terminal 25 is placed at ground potential, and the terminal 23 is placed at minus 21 volts from the line 60 and the line 64. When the switches 62 and 75 are closed, with the switch 66 open, the terminal 23 is placed at ground potential, and the terminal 25 is placed at minus 21 volts from the line 60 and the line 64 to reset the flip-flop circuit 20 to the zero state. The switches 62, 66, and 75 are therefore used to write the state of the volatile flip-flop circuit 20.

By closing the switch 75 alone, the state of the volatile flip-flop circuit 20 can be read at the output terminal 49. If the voltage output at the output terminal 49 is minus 21 volts, the volatile flip-flop circuit 20 is in a zero state. If the voltage output of the output terminal 49 is zero volts, the volatile flip-flop circuit 20 is in a one state.

The volatile flip-flop circuit 20 and the p-channel nonvolatile MNOS transistors 32 and 36 form a nonvolatile flip-flop memory cell 5. Even when the power supply 28 fails, the state of the nonvolatile flip-flop memory cell 5 is not lost. The state is temporarily stored in the p-channel nonvolatile MNOS transistors 32 and 36. The state is automatically rewritten from its temporary location in the p-channel nonvolatile MNOS transistors 32 and 36 back into the volatile flip-flop circuit 20, when power is again supplied from the power supply 28. The volatile flip-flop circuit 20 is automatically reinstated to the state which it had prior to a failure of power from the power supply 28, by means of the slower application of a minus 24 volts via the line 60 through the circuit 57 than via the lines 68 through the circuit 55 when power is again restored, in conjunction with the different threshold voltages of the p-channel MNOS transistors 32 and 36. The nonvolatile MNOS transistor 36 will come on before the nonvolatile MNOS transistor 32, to re-establish the terminal 25 to a negative voltage, and thus reset the volatile flip-flop circuit 20. The negative voltage of the terminal 25 follows the voltage on the line 60 to minus 21 volts. The circuit 57 controls the voltage shape of the line 60 while power is restored. The circuit 55 controls the voltage shape on the line 68 while power is restored from the power supply 28. The circuit 59 controls the voltage shape on the line 64 during power failure and power resumption. The battery 78 is then used to reset the threshold of the MNOS transistor 32 back to − 2 volts.

Figure 2:
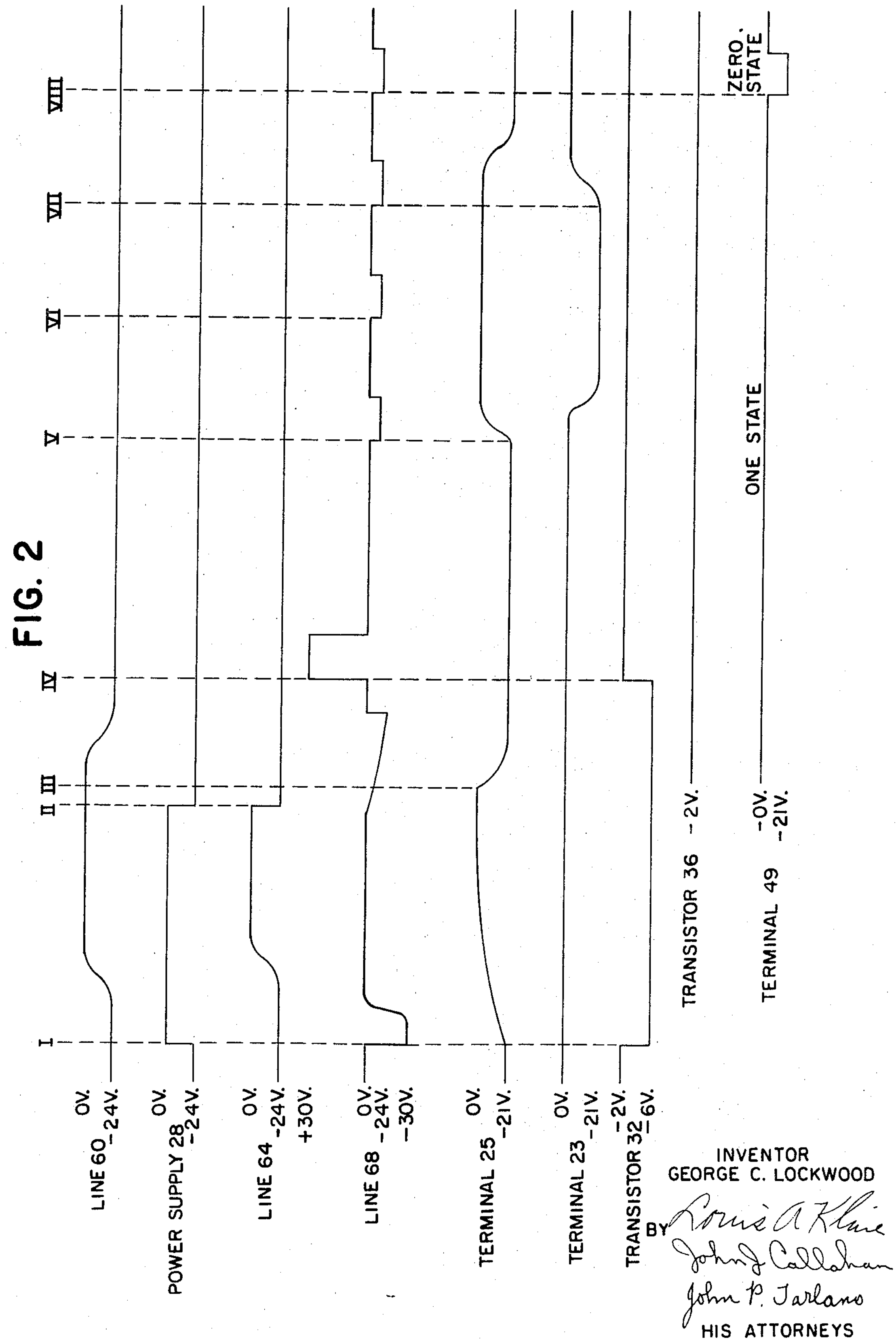
FIG. 2 is a timing diagram for the operation of the nonvolatile memory cell of FIG. 1.

A timing diagram, FIG. 2, shows the operation of the nonvolatile flip-flop memory cell 5 of FIG. 1 before, during, and after a power failure. The state of the volatile flip-flop circuit 20 is stored within the nonvolatile MNOS transistors 32 and 36 upon a power failure. That state is maintained within the MNOS transistors 32 and 36 during a power failure. That state is then reinstated back into the volatile flip-flop circuit 20 after power has been restored to the nonvolatile flip-flop circuit 20.

The voltage shapes on the line 64 and therefore on the MOS load transistors 65 and 69 are shown. The voltage shapes on the line 60 and therefore on the volatile flip-flop circuit 20 are shown. The voltage shapes on the line 68 and therefore on the gate electrodes 33 and 37 of the MNOS transistors 32 and 36 are shown. The output voltage of the power supply 28 is shown. The voltages at the terminal 25 are shown. The voltages at the terminal 23 are shown. The threshold voltages of the MNOS transistor 32 are shown. The threshold voltage of the MNOS transistor 36 is shown. The output voltages of the terminal 49 are shown.

At time I, at the loss of power from the power supply 28, a minus 30-volt potential difference is applied between the gate electrode 33 and the source electrode 30 of the p-channel nonvolatile MNOS transistor 32. A minus 27.5-volt potential exists between the gate electrode 33 and the drain electrode 31, which is at minus 2.5 volts. The MNOS transistor 32 will begin to conduct at a gate voltage of minus 2 volts. However, only 9 volts exist between the gate electrode 37 and the source and drain electrodes 34 and 39, which are at minus 21 volts, of the MNOS transistor 36. The minus 30 volts across the MNOS transistor 32 repulses electrons from its silicon nitride-silicon oxide interface, through its silicon dioxide layer and into its silicon substrate during a period of about 1 millisecond to change its threshold voltage from − 2 to − 6 volts. The lost negative charge from the silicon nitride-silicon oxide interface had provided a built-in gate voltage of about minus 4 volts at the silicon nitride-silicon oxide interface of the p-channel MNOS transistor 32. The threshold voltage (that is, the negative gate voltage required to make the p-channel MNOS transistor 32 begin to conduct a current) is thus changed from minus 2 volts to minus 6 volts. That is, the turn-on voltage for the p-channel MNOS transistor 32 is changed from minus 2 volts to minus 6 volts. The threshold voltage of the p-channel MNOS transistor 36 remains at minus 2 volts, since only a minus 9 volts potential was placed across it.

Again at time I, the power supply 28 fails, as shown in FIG. 2, to immediately place its output to ground potential. At this time, the depletion mode transistor 45 turns on, to connect the minus 30-volt capacitor 38 to the gate electrodes 33 and 37 of the MNOS transistors 32 and 36. A minus 30-volt potential is supplied from the capacitor 38 to the gate electrode 33 of the MNOS transistor 32 to cause this transistor to be conductive. The minus 30-volt potential is also supplied from the capacitor 38 to the gate electrode 37 of the MNOS transistor 36 to cause this transistor to be conductive. Since the terminal 23 of the flip-flop 20 is at ground potential, the source electrode 30 of the nonvolatile MNOS transistor 32 is at ground potential. Nearly minus 30 volts potential is placed between the gate electrode 33 and the source electrode 30 and the drain electrode 31 of the MNOS transistor 32 to change its threshold voltage from minus 2 volts to minus 6 volts, as shown at time I. Since the source electrode 34 and the drain electrode 39 of the MNOS transistor 36 remains at minus 21 volts, only a minus 9 volts potential difference exists between its gate electrode 37 and its source electrode 34 and its drain electrode 39. Therefore the threshold voltage of the MNOS transistor 36 remains at minus 2 volts, as shown at time I.

The threshold voltage of the p-channel MNOS transistor 32 is changed from minus 2 volts to minus 6 volts, since a minus 30-volt potential difference is placed across it. Since only a minus 9-volt potential difference exists between the gate electrode 37 and the source and drain electrodes 34 and 39 of the p-channel MNOS transistor 36, its threshold voltage remains at minus 2 volts.

At time I, almost a 30-volt potential difference exists between the source and drain electrodes 30 and 31 and the gate electrode 33 of the p-channel nonvolatile MNOS transistor 32. At time I, only a 9-volt potential exists between the gate electrode 37 and the source and drain electrodes 34 and 39 of the MNOS transistor 36. The 30-volt potential difference applied across the p-channel MNOS transistor 32 is sufficient to drive electrons from its silicon nitride-silicon oxide interface into its silicon layer to change its threshold voltage from minus 2 volts to minus 6 volts.

At time I, the threshold voltage of the transistor 32 is changed from minus 2 volts to minus 6 volts. That is, minus 6 volts is now required to be between its gate electrode 33 and its source electrode 30 to allow conduction of current from its source electrode 30 to its drain electrode 31.

At time I, only a 9-volt potential difference is applied across the p-channel nonvolatile MNOS transistor 36. This voltage difference is not sufficient to drive electrons from the silicon nitride-silicon oxide interface into the silicon layer of the nonvolatile MNOS transistor 36. The threshold voltage of the MNOS transistor 36 at time I, therefore, remains at minus 2 volts. Only minus 2 volts therefore need be applied between its gate electrode 37 and its source electrodes 34 and 36 after time I to turn it on. That is, only minus 2 volts need be applied between the gate electrode 37 and the source electrode 34 of the p-channel MNOS transistor 36 to allow conduction of current between its source electrode 34 and its drain electrode 39.

At time II of FIG. 2, the voltage on the drain electrode 31 of the MNOS transistor 32 and on the drain electrode 39 of the MNOS transistor 36 is placed at minus 21 volts via the line 64, due to the resumption of power from the power supply 28. At time II, the negative voltage on the source electrode 34 begins to decrease faster than the negative voltage on the source electrode 30, since a decreasing gate voltage is placed via the line 68 on the gate electrodes 33 and 37. The voltage on the source electrode 34 exponentially decreases toward minus 21 volts via the line 64 due to the fact that the nonvolatile MNOS transistor 36 comes on before the nonvolatile MNOS transistor 32. Beginning at time II, the voltage on the line 68 and on the gate electrode 33 of the MNOS transistor 32 and on the gate electrode 37 of the MNOS transistor 36 begins to exponentially decrease toward minus 24 volts, due to the circuit 55.

At time III, the voltage on the gate electrode 37 has reached minus 2 volts. The MNOS transistor 36 begins to conduct, and the voltage at the node 25 begins to go negative. The source electrode 34 is 2 volts more positive than the gate electrode 37 when the MNOS transistor 36 conducts. When the voltage on the gate electrode 37 is at minus 5 volts, the voltage on the terminal 25 is at minus 3 volts. The MOS transistor 16 is turned on at this time to reset the flip-flop circuit 20 to the zero state. The MNOS transistor 32 remains off until the voltage on the line 68 reaches minus 6 volts. The source electrode 34 of the MNOS transistor 36 follows the voltage on the line 68. When the voltage on the line 68 reaches minus 6 volts, the MOS transistor 16 is already turned on, and the MOS transistor 18 remains turned off. The flip-flop circuit 20 is therefore reset when a voltage is attempted to be applied to the terminal 23. A voltage appears on the line 60 after the MOS transistor 16 is turned on, to further reset the flip-flop circuit 20 to the zero state.

The source electrode 82 of the MOS transistor 16 is at ground potential due to its being grounded. The drain electrode 84 and the terminal 23 are held at ground potential, since the MOS transistor 16 is conducting. The voltage on the terminal 25 follows the voltage on the line 60 to − 21 volts. The MOS transistor 18 remains off, due to the zero voltage on its gate electrode 90 from the line 89. When the voltage on the line 60 reaches minus 24 volts, the flip-flop circuit 20 is completely reset.

Again when the voltage on the line 68 reaches minus 6 volts, so that the MNOS transistor 32 can turn on, the voltage on the terminal 25 is already at minus 3 volts. The MOS transistor 16 is already on, and the MOS transistor 18 is held off. The voltage on the terminal 25 will follow the voltage on the line 60 to minus 21 volts. The voltage on the line 60 lags the voltage on the line 68, to properly reset the flip-flop circuit 20.

The terminal 23 remains at ground potential, and the drain electrode 31 of the MNOS transistor 32 goes to minus 2.5 volts when the MNOS transistor 32 comes on, due to voltage division with the load transistor 65. The terminal 23 of the flip-flop circuit 20 is already at zero volts when the MNOS transistor 32 comes on. The node 25 is at minus 4 volts when the nonvolatile MNOS transistor 32 comes on. Therefore, the coming on of the nonvolatile MNOS transistor 32 does not affect the state of the volatile flip-flop circuit 20. The state of the volatile flip-flop circuit 20 has been established by the coming on of the MNOS transistor 36 without the coming on of the MNOS transistor 32. That state is unaffected by the coming on of the volatile MNOS transistor 32 after the coming on of the MNOS transistor 36. The voltage of the terminal 25 follows the voltage on the line 60 to minus 21 volts, with a 3-volt loss across the MOS transistor 14.

The terminal 23 is at ground potential. The gate electrode 90 of the MOS transistor 18 is at ground potential. The MOS transistor 18 is therefore off. The MOS transistor 16 is on. The source electrode 92 of the MOS transistor 18 is at ground potential, since it is grounded. The drain electrode 94 of the MOS transistor 18 followed the voltage of the terminal 25 to minus 21 volts via the line 60. The flip-flop circuit 20 is thus reset to the zero state at time III.

Between time III and time IV, the nonvolatile MNOS transistors 32 and 36 are held on until the voltage on the line 60 reaches minus 24 volts. When the voltage on the line 60 reaches minus 24 volts, the voltage at the node 25 is at minus 21 volts, due to the 3-volt voltage drop across the MOS transistor 14. After the voltage on the line 60 has reached minus 24 volts, the MNOS transistors 32 and 36 may be turned off with the switch 77 without affecting the state of the flip-flop circuit 20, which has been reset to the zero state which it had prior to time I when the power supply 28 failed.

At time IV, the switch 77 is switched to a plus 30-volt voltage source 78 to return the threshold voltage of the MNOS transistor 32 to minus 2 volts. The threshold voltage of the MNOS transistor 32 is returned to minus 2 volts by placing a plus 30 volts on its gate electrode 33 with respect to its grounded substrate for 1 millisecond. The MNOS transistor 36, whose threshold voltage is already at minus 2 volts, is unaffected.

The voltage on the line 68 is placed at plus 30 volts. A plus 30 volts exists between the gate electrode 33 and the grounded substrate of the nonvolatile MNOS transistor 32. The threshold of the nonvolatile MNOS transistor 32 is returned from minus 6 volts to minus 2 volts. A plus 30 volts also exists between the gate electrode 37 and the grounded substrate of the nonvolatile transistor 36. However, since the threshold of the nonvolatile MNOS transistor 36 is already at minus 2 volts, its threshold is unaffected. At time IV, the threshold voltage of the nonvolatile MNOS transistor 32 is returned to minus 2 volts, the threshold voltage which it had just prior to the loss of power from the power supply 28 at time I.

At time V, the state of the flip-flop circuit 20 is changed from a zero state to a one state. The switch 77 is placed in its horizontal position, and the switches 66 and 75 are closed, to write the voltage of the terminal 25 from minus 21 volts to zero volts. The change in the voltage at the terminal 23 to minus 21 volts follows the change in the voltage at the terminal 25 to ground potential. The voltage at the terminal 23 automatically changes from zero volts to minus 21 volts. The state of the flip-flop circuit 20 is written from a zero state to a one state. Its state is read at time VI by closing only the switch 75 at the terminal 49.

At time VII, the switches 62 and 75 are closed to change the terminal 23 from minus 21 volts to 0 volts. The voltage at the terminal 25 automatically changes from 0 volts to minus 21 volts. The state of the flip-flop circuit 20 is written from a one state back to a zero state.

At time VIII, the switch 75 is closed with the switches 62 and 66 open, to read the state of the volatile flip-flop circuit 20. The battery 92 places a minus 12-volt read voltage on the MNOS transistors 32 and 36. The MNOS transistor 36 connects the terminal 49 to the terminal 25. The voltage on the terminal 49 is then minus 21 volts. This negative voltage on the terminal 49 indicates that the flip-flop circuit 20 is in a zero state.

The nonvolatile flip-flop memory cell 5 is made up of a volatile flip-flop circuit 20 and two nonvolatile MNOS transistors 32 and 36. It should be noted, however, that another volatile bistable circuit could be used in place of the volatile flip-flop circuit 20, with appropriate circuit changes being made. In fact, any nonvolatile bistable device which has two unequal potential terminals may be used as part of the nonvolatile memory cell which is contemplated by this invention.

The MNOS transistors 32 and 36 of FIG. 1 have approximately 30-Angstrom-thick silicon oxide layers and 100-Angstrom-thick silicon nitride layers, so that negative charge may be drawn to the silicon dioxide-silicon nitride interface through the silicon oxide layer from the silicon substrate. The negative charge at the silicon dioxide-silicon nitride interface then tends to decrease the threshold voltage of the MNOS transistor which has the charge therein. This is the preferred structure of the MNOS transistors 32 and 36.

The MNOS transistors 32 and 36 of FIG. 1 could be built with thin silicon nitride layers and thick silicon oxide layers. The negative charge would then tunnel through the thin silicon nitride layer to the silicon nitride-silicon oxide interface from the metal gate electrode above the silicon nitride layer. The charge at the silicon nitride-silicon oxide interface would again act to decrease the threshold voltage of the MNOS transistor which has the charge therein.

In place of the nonvolatile variable threshold MNOS transistors 32 and 36, MAOS transistors could be used. A nonvolatile variable threshold MAOS transistor has a metal gate electrode, an aluminum oxide insulator layer, a thin silicon oxide insulator layer, and a silicon substrate. The charge is stored at the interface between the aluminum oxide and the silicon oxide to decrease the threshold of the nonvolatile MAOS transistor. Other insulator materials could be substituted for aluminum oxide or silicon nitride to form nonvolatile variable threshold field effect transistors.

The nonvolatile flip-flop memory cell 5 of FIG. 1 uses MOS metal-oxide-silicon field effect transistors 12, 14, 16, and 18 therein. FIG. 1 also shows MOS read-write load transistors 65 and 69. Each MOS transistor includes a gate electrode to which a minus 2-volt threshold potential with respect to the voltage on the source electrode must be applied to allow the flow of current between its source electrode to the drain electrode. The transistors 12, 14, 65, and 69 have 100,000 ohms internal resistance. The transistors 16 and 18 have 5,000 ohms internal resistance.

The MOS transistors 12, 14, 16, 18, 65, and 69 are insulated-gate field-effect transistors. Each MOS transistor is a p-channel MOS transistor. That is, each is formed on a substrate which is N type. The source and drain regions are then doped to be p-type and are at the surface, to provide planar construction of the MOS transistors. These two p-type regions are connected by a p-channel at the surface of the substrate, which channel is located beneath the gate electrode, when at least a minus 2-volt negative potential is applied to the gate electrode with respect to the source electrode of the MOS transistors. The MOS transistors 12, 14, 16, 18, 65, and 69 are enhancement type, by which is meant that the channel between the source and drain regions is normally non-conducting and is rendered conducting by the application of a negative threshold gate voltage with respect to the source electrode. For conduction to occur, there must be a negative voltage difference between the source and drain regions, and the gate voltage must be minus 2 volts less than the voltage on the more positive of the two p-type regions, which is the source electrode. The MOS transistors 12, 14, 16, 18, 65, and 69 will have a 3-volt voltage loss between their two p-type regions while they are conducting.

The practice of the invention is not limited to enhancement mode PNP structures for the flip-flop circuit 20, since NPN field effect devices can also be used. Depletion mode devices, in which the channel between source and drain is normally conducting and is rendered non-conducting by gate signals, can also be employed with appropriate changes in the voltages applied to the nonvolatile memory cell 5.

The nonvolatile flip-flop cell 5 of FIG. 1 also has two alterable threshold voltage metal-silicon nitride-silicon oxide-silicon (MNOS) nonvolatile field effect transistors 32 and 36. They have an internal resistance of 5,000 ohms each. The MNOS field effect transistors are also p-channel transistors. Each MNOS transistor has a 1,000-Angstrom-thick silicon nitride insulator layer above an approximately 30-Angstrom-thick silicon dioxide insulator layer. The MOS transistors have 500-Angstrom-thick silicon oxide layers. The MNOS transistors each initially have a threshold voltage of minus 2 volts. That is, a potential of at least minus 2 volts must be placed to the gate electrode of the MNOS transistor with respect to the voltage on the more positive of the two p-type regions, which is the source electrode, in order to allow a current to flow from the less negative p-type region, which is the source electrode, to the more negative p-type region, which is the drain electrode. The MNOS transistors 32 and 36 differ from the MOS transistors 12, 14, 16, 18, 65, and 69, in that the threshold voltages of the nonvolatile MNOS transistors 32 and 36 may be varied, whereas the threshold voltage of the MOS transistors 12, 14, 16, 18, 65, and 69 is fixed. The MNOS transistors are said to be nonvolatile because their threshold voltages remain stable even though no power is applied to them.

The threshold voltage of the MNOS transistor 32 is initially placed at minus 2 volts due to negative charge being stored at its silicon nitride-silicon oxide interface. By applying approximately a minus 30-volt potential for 1 millisecond between its gate electrode 33 of each MOS transistor 32 and its two p-regions, its threshold voltage is lowered to minus 6 volts by driving stored electrons out of the silicon nitride-silicon oxide interface and back into the silicon substrate. The lowering of the threshold voltage of the MNOS transistor 32 is due to the driving of the electrons which were stored at the silicon nitride-silicon oxide interface through the thin silicon oxide layer and into the n-type silicon substrate below. The silicon nitride-silicon oxide interface is depleted of extra electrons which were stored therein. These extra electrons cannot now act on the n-type material between the two p-type regions of the MNOS transistor 32. Since these extra electrons are not available to help create a p-type channel between the two p-type regions, extra negative gate potential is needed to make up for their effect in creating a p-type channel for conduction. The extra negative gate potential is the minus 4-volt difference which is seen in changing the threshold voltage of the MNOS transistor 32 from minus 2 volts to minus 6 volts.

Only a minus 9-volt potential rather than a minus 30-volt potential is placed on the gate electrode 37 of the MNOS transistor 36 with respect to the two p-type regions, for 1 microsecond. The threshold voltage of the MNOS transistor 36 will remain at minus 2 volts. This is due to the fact that the electric field so created across the silicon oxide layer is not sufficient to drive electrons from the silicon nitride-silicon oxide interface, through the silicon oxide layer, and into the n-type substrate.

The nonvolatile MNOS transistor 32, which has a threshold of minus 6 volts at time II, has its threshold voltage raised back to minus 2 volts at time IV. The threshold voltage of the MNOS transistor 32 is raised back to minus 2 volts by applying a plus 30-volt potential on the gate electrode 33 with respect to its grounded substrate, for 1 millisecond. Some electrons are drawn from the n-type substrate through the thin silicon oxide insulating layer and to the silicon nitride-silicon oxide interface. These extra electrons negatively charge the silicon nitride-silicon oxide interface. These extra electrons aid in the formation of a p-type channel between the two p-type regions. The amount of negative potential that need be on the gate electrode 33 with respect to the more positive source electrode 30 need now be only minus 2 volts. The thickness of the silicon oxide layer of the alterable threshold voltage nonvolatile MNOS transistors 32 and 36 is again about 30 Angstroms.

When the MOS transistor 18 is on and the MOS transistor 16 is off, the volatile flip-flop circuit 20 of FIG. 1 is said to be in a one state. When the power goes off with the flip-flop circuit 20 in a one state, the threshold voltage of the MNOS transistor 36 changes from − 2 volts to − 6 volts, and the threshold voltage of the MNOS transistor 32 remains at − 2 volts. The electrical behavior of the nonvolatile flip-flop cell 5 of FIG. 1 is reversed from that described above.

Figure 3:
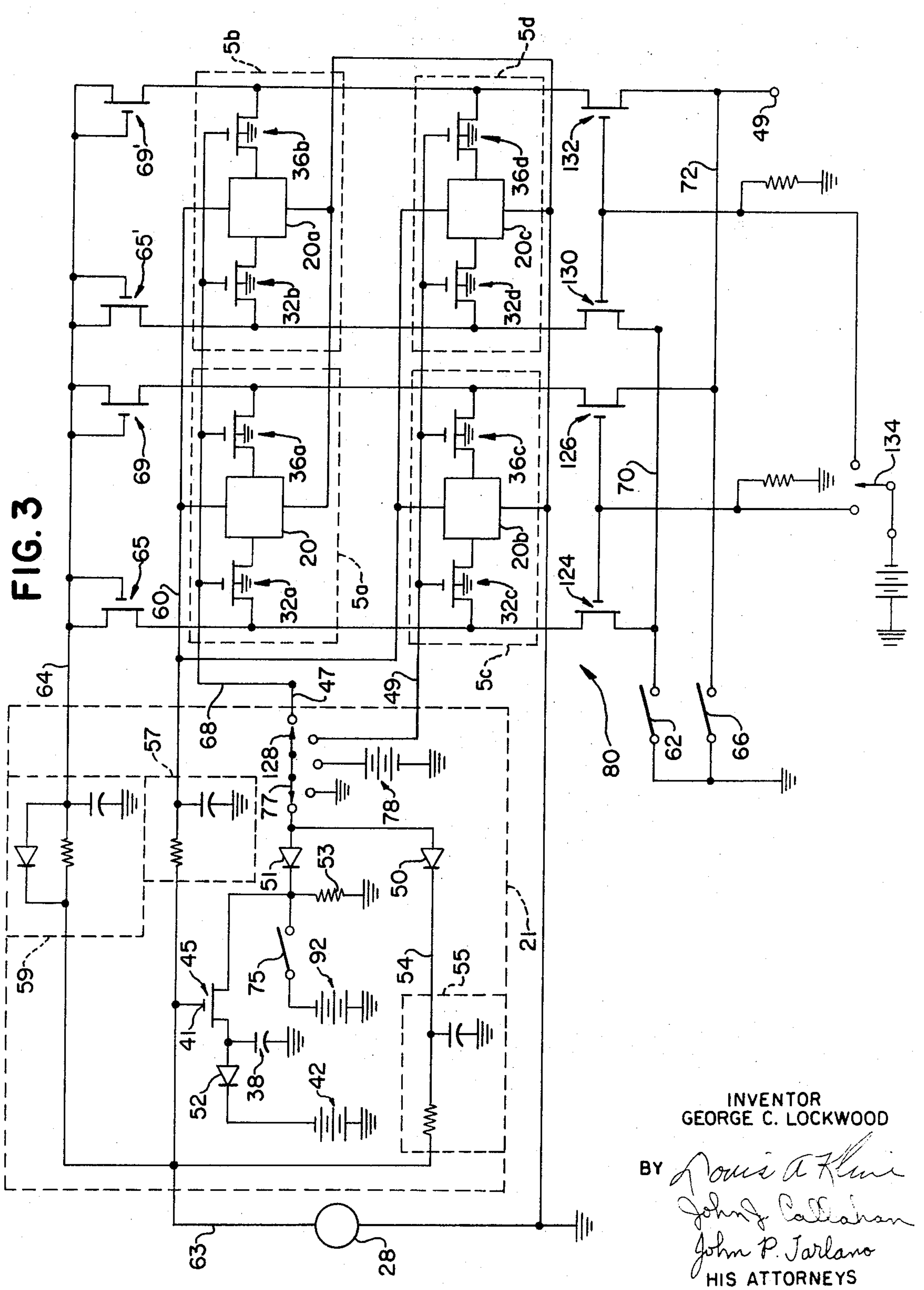
FIG. 3 is a schematic view of an array of nonvolatile memory cells of the present invention.

FIG. 3 shows an array 80 of nonvolatile flip-flop memory cells *5a*, *5b*, *5c*, and *5d*, each flip-flop memory cell having a volatile flip-flop circuit 20 protected by a pair of MNOS alterable threshold voltage transistors 32 and 36 therein. Each nonvolatile flip-flop memory cell behaves as shown and described in FIGS. 1 and 2. The electrical characteristics for storing the state of each volatile flip-flop circuit 20 into its nonvolatile MNOS transistors 32 and 36 is the same as for the operation of the nonvolatile memory cell 5 of FIG. 1.

In FIG. 3, the switch 128 first is used to select a row of nonvolatile flip-flop cells *5a* and *5b* to store the states of that row of nonvolatile flip-flop memory cells during a power failure. The switch 128 then switches to the next lower row of nonvolatile flip-flop memory cells as the power continues to fail to the nonvolatile flip-flop memory cells *5c* and *5d*. The selection of a row of nonvolatile flip-flop memory cells is required so that the storage of the states of the flip-flop circuits 20 in one row will not affect the storage of the states of the flip-flop circuits 20 in another row. The states of the flip-flop circuits 20 in each row is stored within their nonvolatile MNOS transistors in that row.

The array 80 of nonvolatile flip-flop memory cells 5 has switches 62, 66, 75, 128, and 134 connected thereto. The selection switches 128, 75, and 134, which are used to change the state of a selected nonvolatile flip-flop memory cell 5 in the array 80. The writing switches 62 and 66 are used to ground a terminal of a flip-flop circuit 20 of any nonvolatile flip-flop memory cell in the array 80 to change its state thereby. The changing of the state of the selected flip-flop circuit 20 of the selected nonvolatile flip-flop memory cell 5 of FIG. 3 is automatically made due to the lowering of the voltage on the terminal opposite the newly grounded terminal.

The switches 75, 128, and 134 are used without the switches 62 and 66, to read the state of a selected nonvolatile flip-flop memory cell in the array 80. The switches 75 and 128 apply minus 12 volts from the battery 92 to the gates of the MNOS transistors 32 and 36 to turn them on. The voltage on the right terminal of the selected volatile flip-flop circuit 20 of the selected nonvolatile flip-flop memory cell is then read at the terminal 49. If the voltage is minus 21 volts, the selected nonvolatile flip-flop memory cell is in a zero state. If the voltage is zero volts at the terminal 49, the selected nonvolatile flip-flop memory cell is in a one state.

The nonvolatile memory array 80 of FIG. 3 may be used as a nonvolatile solid state memory to store binary information nonvolatilely. The nonvolatile memory array 80 of FIG. 3 may be used as a random access memory of a computer. Such a nonvolatile memory array 80 has the advantage that information therein is not lost if power is accidentally lost to the computer. Various other uses for a nonvolatile flip-flop memory cell 5 of FIG. 1 and the nonvolatile memory array 80 of FIG. 3 will be apparent to those skilled in the art.

The information may be nonvolatilely stored within the nonvolatile MNOS transistors within each pair of nonvolatile flip-flop cells 5 of the array 80 of FIG. 3 for a period of up to 1 year. Thus the nonvolatile array 80 of FIG. 3 has a very long nonvolatile life.

The MOS transistors 12 and 14 may be eliminated from the flip-flop circuit 20 of FIG. 1. The transistors 12 and 14 are the load resistors in the flip-flop circuit 20 of FIG. 1. The MOS transistors 12 and 14 are removed, leaving an open circuit between the line 60 and the terminals 23 and 25. In this embodiment, the terminals 23 and 25 are periodically pulsed to maintain their relative voltage levels, through the MNOS transistors 32 and 36. The line 60 can stop at the gate 41 of the depletion mode transistor 45. The pulsing is accomplished by periodically pulsing the line 68 through the switch 75. The state of the new MOS flip-flop circuit is reinstated by periodically closing the switch 75, so that the relative voltage on the drain electrodes 84 and 94 of the MOS transistors 16 and 18 is periodically re-established. The switch 75 is periodically closed to periodically recharge whichever terminal 23 or 25 is at a negative voltage. This periodic recharging is necessary, since a certain amount of current leakage does occur through whichever one of the MOS transistors 16 or 18 is supposed to be held in the off condition. The periodic closing of the switch 75 brings whichever terminal 23 or 25 is supposed to be at a negative voltage periodically back to that voltage level via the line 64. The MNOS transistors 32 and 36 are made conductive to the terminals 23 and 25 during the time of periodic pulsing.

The start-up operation after power failure of such a new flip-flop circuit is similar to that shown for the flip-flop 20 of FIG. 1, with the exception that, instead of a minus 24 volts being established on the line 60 after a decreasing gate voltage has been applied to the MNOS transistors 32 and 36, the switch 75 periodically closes to place and maintain the terminals 23 and 25 at their different voltage levels. In this embodiment, the terminals 23 and 25 would be at zero volts or minus 12 volts, the same as the minus 12 volts connected to the switch 75. HOwever, an MNOS transistor connected to either flip-flop terminal 23 or 25 still will have threshold voltage selectively changed during power failure.

The timing diagram for such a new flip-flop circuit is similar to that shown in FIG. 2. The only difference is that a periodic minus 12 volts is applied on the line 68 via the switch 75 to maintain the proper voltage at the terminals 23 and 25. Otherwise, the timing diagram is the same as that shown in FIG. 2.

What is claimed is:

1. A nonvolatile memory cell for nonvolatilely holding a binary bit of information therein without power being applied thereto, comprising:

a. volatile bistable memory means having two bistable terminals for storing a binary bit of information therein and reading binary information thereout while power is supplied thereto; and b. first and second nonvolatile memory means connected to the two bistable terminals of the volatile bistable memory means, for nonvolatilely storing the relative voltage values of the two bistable terminals of the volatile bistable memory means during the loss of power to the volatile bistable memory means, so that the binary bit of information is nonvolatilely held during the absence of power to the volatile bistable memory means.

2. The nonvolatile memory cell of claim 1 wherein the volatile bistable memory means is a volatile flip-flop circuit.

3. The nonvolatile memory cell of claim 1 wherein the first and second nonvolatile memory means are nonvolatile transistors which have variable threshold voltages, each nonvolatile transistor being able to nonvolatilely store the voltage value of its bistable terminal of the volatile bistable memory means during the absence of power to the volatile bistable memory means.

4. The nonvolatile memory cell of claim 3 wherein the first and second nonvolatile transistors are nonvolatile MNOS transistors which have variable threshold voltages, each nonvolatile MNOS transistor being able to nonvolatilely store the voltage value of its bistable terminal of the volatile bistable memory means during the absence of power to the volatile bistable memory means.

5. A nonvolatile flip-flip memory cell circuit comprising:

a. a volatile flip-flop circuit having a first bistable terminal with a first or second stable voltage value and a second bistable terminal with a second or first stable voltage value to provide the volatile flip-flop circuit with two stable states;

b. a first nonvolatile variable threshold voltage transistor having a source electrode, a drain electrode, and a gate electrode, the source electrode of said first nonvolatile variable threshold voltage transistor connected to the first bistable terminal;

c. a second nonvolatile variable threshold voltage transistor having a source electrode, a drain electrode, and a gate electrode, the source electrode of said second nonvolatile variable threshold voltage transistor connected to the second bistable terminal;

d. power supply means connected across said volatile flip-flop circuit for supplying power thereto, thereby holding the volatile flip-flop circuit in one of its two stable states; and e. a power supply sensing switch means coupled to the power supply means for allowing the passage of a gate writing voltage to the gate electrodes of said first and second nonvolatile variable threshold voltage transistors as the power supply means begins to fail.

6. A nonvolatile flip-flop memory cell circuit comprising:

a. a volatile flip-flop circuit having a first bistable terminal with a first or second stable voltage value and a second bistable terminal with a second or first stable voltage value to provide the volatile flip-flop circuit with two stable states;

b. a first nonvolatile variable threshold voltage transistor having a source electrode, a drain electrode, and a gate electrode, the source electrode of a first nonvolatile variable threshold voltage transistor connected to the first bistable terminal;

c. a second nonvolatile variable threshold voltage transistor having a source electrode, a drain electrode, and a gate electrode, the source electrode of a second nonvolatile variable threshold voltage transistor connected to the second bistable terminal;

d. power supply means connected across said volatile flip-flop circuit for supplying power thereto, thereby holding the volatile flip-flop circuit in one of its two stable states;

e. a drain voltage means connected to the drain electrode of each nonvolatile variable threshold voltage transistor for applying a drain voltage to the drain electrode of each nonvolatile variable threshold voltage transistor;

f. a power supply sensing switch means coupled to the power supply means for allowing the passage of a gate writing voltage as the power supply means begins to fail; and g. a gate writing voltage means connectable through the power supply sensing switch means to the gate electrode of each nonvolatile variable threshold voltage transistor for negatively increasing the threshold voltage of the nonvolatile variable threshold voltage transistor whose source electrode is connected to the bistable terminal of the volatile flip-flop circuit which is at the less negative voltage value, as the power supply means begins to fail to deliver power to the volatile flip-flop circuit.

7. A nonvolatile flip-flop memory cell circuit comprising:

a. a volatile flip-flop circuit having a first bistable terminal with a first or second stable voltage value and a second bistable terminal with a second or first stable voltage value to provide the volatile flip-flop circuit with two stable states;

b. a first nonvolatile variable threshold voltage transistor having a source electrode, a drain electrode, and a gate electrode, the source electrode of a first nonvolatile variable threshold voltage transistor connected to the first bistable terminal;

c. a second nonvolatile variable threshold voltage transistor having a source electrode, a drain electrode, and a gate electrode, the source electrode of a second nonvolatile variable threshold voltage transistor connected to the second bistable terminal;

d. power supply means connected across said volatile flip-flop circuit for supplying power thereto, thereby holding the volatile flip-flop circuit in one of its two stable states;

e. a drain voltage means connected to the drain electrode of each nonvolatile variable threshold voltage transistor for applying a drain voltage to the drain electrode of each nonvolatile variable threshold voltage transistor;

f. a power supply sensing switch means coupled to the power supply means for allowing the passage of a gate writing voltage as the power supply means begins to fail;

g. a gate writing voltage means connectable through the power supply sensing switch means to the gate electrode of each nonvolatile variable threshold voltage transistor for negatively increasing the threshold voltage of the nonvolatile variable threshold voltage transistor whose source electrode is connected to the bistable terminal of the volatile flip-flop circuit which is at the less negative voltage value, as the power supply means begins to fail to deliver power to the volatile flip-flop circuit; and h. a gate reading voltage means connectable to the gate electrodes of said nonvolatile variable threshold voltage transistors just before the resumption of power from said power supply means to said volatile flip-flop circuit for turning on the nonvolatile variable threshold voltage transistor whose threshold voltage was not negatively increased, prior to the turning on of the nonvolatile variable threshold voltage transistor whose threshold voltage was negatively increased, to reset the volatile flip-flop circuit to the state which it had prior to the loss of power thereto.

8. A nonvolatile flip-flop memory cell circuit comprising:

a. a volatile flip-flop circuit having a first bistable terminal with a first or second stable voltage value and a second bistable terminal with a second or first stable voltage value to provide the volatile flip-flop circuit with two stable states;

b. a first nonvolatile variable threshold voltage transistor having a source electrode, a drain electrode, and a gate electrode, the source electrode of a first nonvolatile variable threshold voltage transistor connected to the first bistable terminal;

c. a second nonvolatile variable threshold voltage transistor having a source electrode, a drain electrode, and a gate electrode, the source electrode of a second nonvolatile variable threshold voltage transistor connected to the second bistable terminal;

d. power supply means connected across said volatile flip-flop circuit for supplying power thereto, thereby holding the volatile flip-flop circuit in one of its two stable states;

e. a drain voltage means connected to the drain electrode of each nonvolatile variable threshold voltage transistor for applying a drain voltage to the drain electrode of each nonvolatile variable threshold voltage transistor;

f. a power supply sensing switch means coupled to the power supply means for allowing the passage of a gate writing voltage as the power supply means begins to fail;

g. a gate writing voltage means connectable through the power supply sensing switch means to the gate electrode of each nonvolatile variable threshold voltage transistor for negatively increasing the threshold voltage of the nonvolatile variable threshold voltage MNOS transistor whose source electrode is connected to the bistable terminal of the volatile flip-flop circuits which is at the less negative voltage value, as the power supply means begins to fail to deliver power to the volatile flip-flop circuit;

h. a gate reading voltage means connectable to the gate electrodes of said nonvolatile variable threshold voltage transistors just before the resumption of power from said power supply means to said volatile flip-flop circuit for turning on the nonvolatile variable threshold voltage transistor whose threshold voltage was not negatively increased prior to the turning on of the nonvolatile variable threshold voltage transistor whose threshold voltage was negatively increased to reset the volatile flip-flop circuit to the state which it had prior to the loss of power thereto; and i. a gate voltage erasing means connectable to the gate electrodes of said nonvolatile variable threshold voltage transistors after the resumption of power from said power supply means to said volatile flip-flop circuit, for negatively decreasing the threshold voltage of the nonvolatile variable threshold voltage transistor whose threshold voltage was negatively increased.

9. An array of nonvolatile flip-flop memory cells for nonvolatilely holding a binary bit of information within each cell thereof without power being applied thereto, comprising:

a. an array of volatile flip-flop circuits, each volatile flip-flop circuit having two bistable terminals, the array of volatile flip-flop circuits being used for storing several binary bits of information therein while power is applied thereto; and b. an array of first and second nonvolatile memory means, each first and second nonvolatile memory means being connected to the two bistable terminals of each of said volatile memory means, said array of first and second nonvolatile memory means being used for nonvolatilely holding the voltage values of the two bistable terminals of the bistable memory means during the absence of power to the array.

10. The array of claim 9 wherein the nonvolatile memory means are nonvolatile variable threshold voltage field effect transistors.

11. The array of claim 9 wherein the nonvolatile variable threshold voltage field effect transistors are nonvolatile MNOS field effect transistors.

12. A nonvolatile memory cell for nonvolatilely holding a binary bit of information therein without power being applied thereto, comprising:

a. a volatile bistable memory means having a bistable terminal therein, for storing a binary bit of information therein and reading binary information thereout while power is applied thereto; and b. a nonvolatile memory means connected to said bistable terminal of said volatile bistable memory means for nonvolatilely storing the voltage value of said bistable terminal of said volatile bistable memory means during the loss of power to the volatile bistable memory means, so that said binary bit of information is nonvolatilely stored in said nonvolatile memory means during the absence of power to the volatile bistable memory means.

13. The nonvolatile memory cell of claim 12 wherein the volatile bistable memory means is a volatile flip-flop circuit.

14. The nonvolatile memory cell of claim 12 wherein the nonvolatile memory means is a nonvolatile transistor which has a variable threshold voltage, said nonvolatile transistor therefore being able to nonvolatilely store the voltage value of said bistable terminal of said volatile bistable memory means during the loss of power to volatile bistable memory means.

15. The nonvolatile memory cell of claim 14 wherein said nonvolatile transistor is a nonvolatile MNOS transistor which has a variable threshold voltage, said nonvolatile MNOS transistor being able to nonvolatilely store the voltage value of said bistable terminal of said volatile bistable memory means during the loss of power to the volatile bistable memory means.

* * * * *